Aug. 11, 1936.　　　　R. A. HILLE　　　　2,050,793

ATTACHMENT FOR GASOLINE TANKS

Filed Dec. 12, 1935

INVENTOR.
Robert A. Hille
BY Murray & Zugelter
ATTORNEYS

Patented Aug. 11, 1936

2,050,793

UNITED STATES PATENT OFFICE 2,050,793

ATTACHMENT FOR GASOLINE TANKS

Robert A. Hille, Cincinnati, Ohio

Application December 12, 1935, Serial No. 54,090

4 Claims. (Cl. 220—86)

The present invention relates to an attachment for gasoline tanks which will prevent the removal of the contents of the tank by syphoning or by a similar means.

An object of the invention is to provide an anti-theft attachment for tanks which will effectively prevent syphoning or the like, whilst allowing a free and unobstructed passage for gasoline introduced into the tank.

Another object of the invention is to provide an attachment which may be manufactured at a small cost, is of simple design and capable of fitting all types of gasoline tanks.

A further object is to provide an attachment which may be conveniently fastened to the inside wall of a gasoline tank beneath the inlet opening thereof.

Other objects will be apparent from the following specification, in which.

Figure 1:
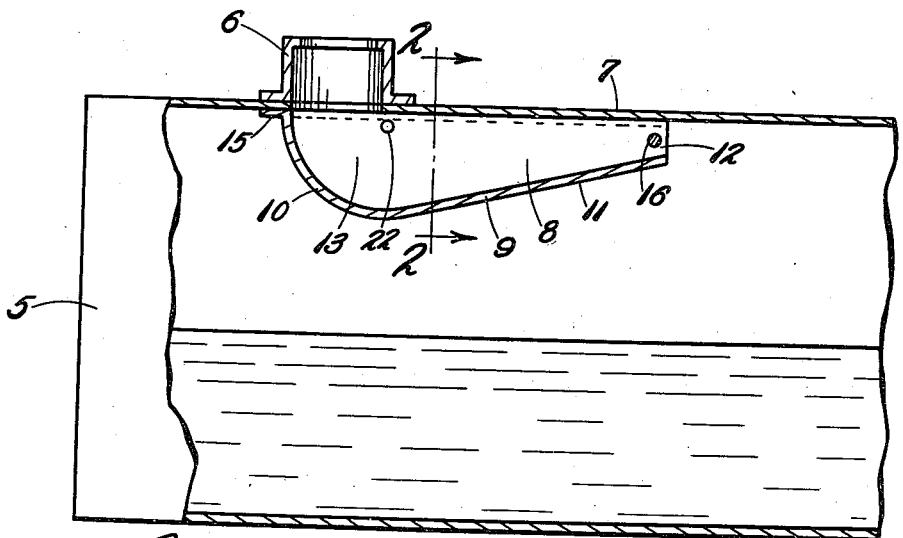
Fig. 1 is a fragmental view of a gasoline tank showing my anti-theft attachment in cross section and positioned beneath the inlet opening.

The embodiment of my invention consists of a conventional gasoline tank 5 having an inlet opening 6 which is positioned upon its upper wall 7. The inlet opening may be of any shape whatever to conform to the particular body style of the automobile, or the like, upon which the tank is positioned, provided the shape does not interfere with the free flow of gasoline being supplied to the tank. Generally the anti-theft attachment 8 is positioned on the inside wall of the tank beneath the inlet opening. The attachment has a curved bottom portion (Fig. 1) subjacent the opening to readily change the direction of the downflowing liquid to an upward movement along the inclined straight portion of the bottom and thence to the mouth of the device. The attachment also has an initially deep and narrow channel formed by the curved bottom portion and the sides of the device (Fig. 2) which gradually changes to a shallow and wide channel due to the upward inclination of the bottom and the diverging direction of the sides. This construction provides a uniform dimension for the channel to facilitate the passage of liquid therethrough. The mouth of the device is situated close to the upper wall of the tank for two obvious reasons: first, to allow the tank to contain the maximum amount of gasoline without a backward flow of liquid in the attachment, and secondly, to provide an anti-theft device which is inaccessible. A rod or other protecting means is placed over the mouth to doubly insure inaccessibility to the contents of the tank.

Figure 2:
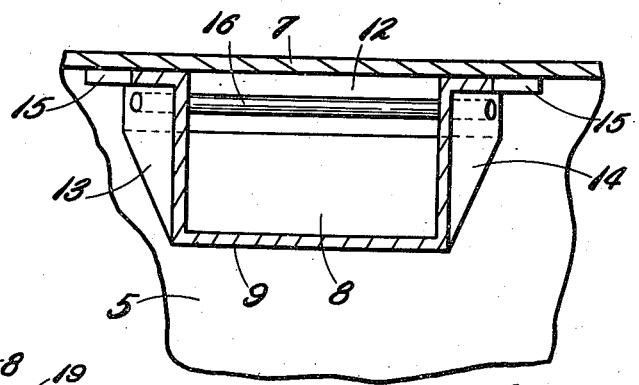
Fig. 2 is an enlarged cross sectional view taken on line 2—2 of Fig. 1.

The anti-theft attachment 8 has a bottom 9 which is provided with a curved portion 10 and a straight portion 11. The straight portion extends upwardly to the mouth 12 of the device. Side walls 13 and 14, integral with the bottom 9, diverge outwardly to the mouth 12 (Fig. 2). The upper free ends of the side walls and the free end of the bottom are bent outwardly to form flanges 15 which may be soldered, welded or otherwise fastened to the inside surface of the wall 7. A protecting means which conveniently takes the form of a horizontal rod 16 is fastened to the side walls 13 and 14 and extends transversely of the mouth 12.

Figure 3:
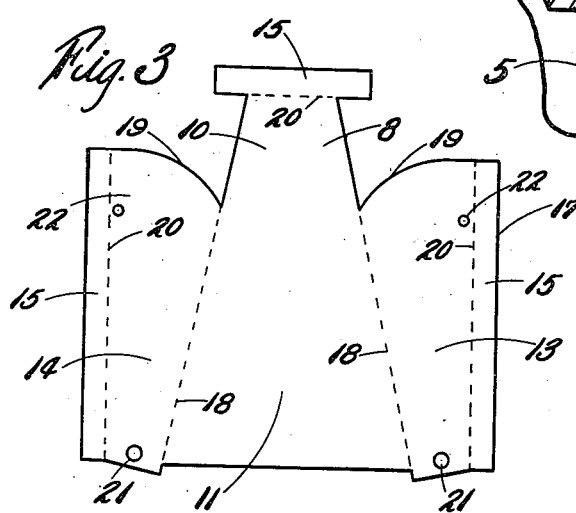
Fig. 3 is a plan view of a blank from which my attachment is formed.

Fig. 3 is a plan view of a blank 17 punched from a sheet of suitable material. The side walls 13 and 14 are formed by bending the blank along the dotted lines 18. The edges of the curved bottom portion 10 are then soldered to the curved edges 19 of the side walls. The free ends of the device are bent at right angles to the sides therealong the dotted lines 20 to form fastening means when the device is positioned on the inside surface of the tank. Two annular holes 21 may be provided in the sides 13 and 14 to receive the rod.

A breather hole 22 is punched in the sides of my attachment to prevent overflowing in the inlet opening, caused by bubbling in the supplied gasoline when a large amount of the liquid is introduced into the tank.

What is claimed is:

1. In an anti-theft attachment for gasoline tanks the combination with a tank having an inlet opening, of a narrow extended mouth, of a bottom comprising a downwardly extending curved portion subjacent the inlet opening and a straight portion extending upwardly to the mouth, of two side walls engaging the longitudinal edges of the bottom and diverging outwardly to the mouth, of a flange formed about the free ends of the side walls and the curved bottom portion and adapted to engage the inner side of the tank about the inlet opening and of a horizontal rod positioned transversely of the mouth.

2. In an anti-theft attachment for gasoline tanks the combination with a tank having an inlet opening, of a narrow, extended mouth, of a bottom comprising a downwardly extending curved portion subjacent the inlet opening and a straight portion extending from the curved portion upwardly to the mouth, of two side walls engaging the longitudinal edges of the bottom and diverging outwardly to the mouth, of a flange formed about the free ends of the side walls and the curved bottom portion and adapted to engage the inner side of the tank about the inlet opening.

3. In an anti-theft attachment for gasoline tanks the combination with a tank having an inlet opening, of a narrow, extended mouth, of a bottom comprising a downwardly extending curved portion subjacent the inlet opening and a straight portion extending from the curved portion upwardly to the mouth, of two side walls engaging the longitudinal edges of the bottom and diverging outwardly to the mouth and means adapted to fasten the side walls and the free end of the curved portion of the bottom to the inner side of the tank about the inlet opening.

4. In an anti-theft attachment for gasoline tanks the combination with a tank having an inlet opening, of a mouth, a bottom subjacent to the inlet opening and extending upwardly to the mouth, of two sides engaging the bottom and diverging outwardly to the mouth and of means for fastening the two sides and the free end of the bottom on the inner wall of a tank about the inlet opening.

ROBERT A. HILLE.